Figure 5:
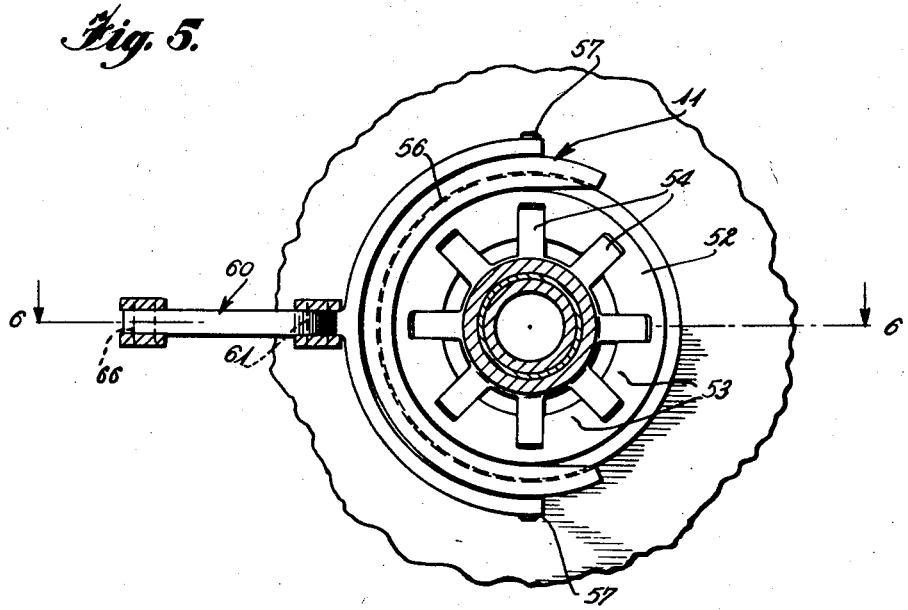

June 19, 1951     W. M. SIESEL     2,557,894
POWER TRANSMISSION
Filed Oct. 19, 1945     7 Sheets-Sheet 1
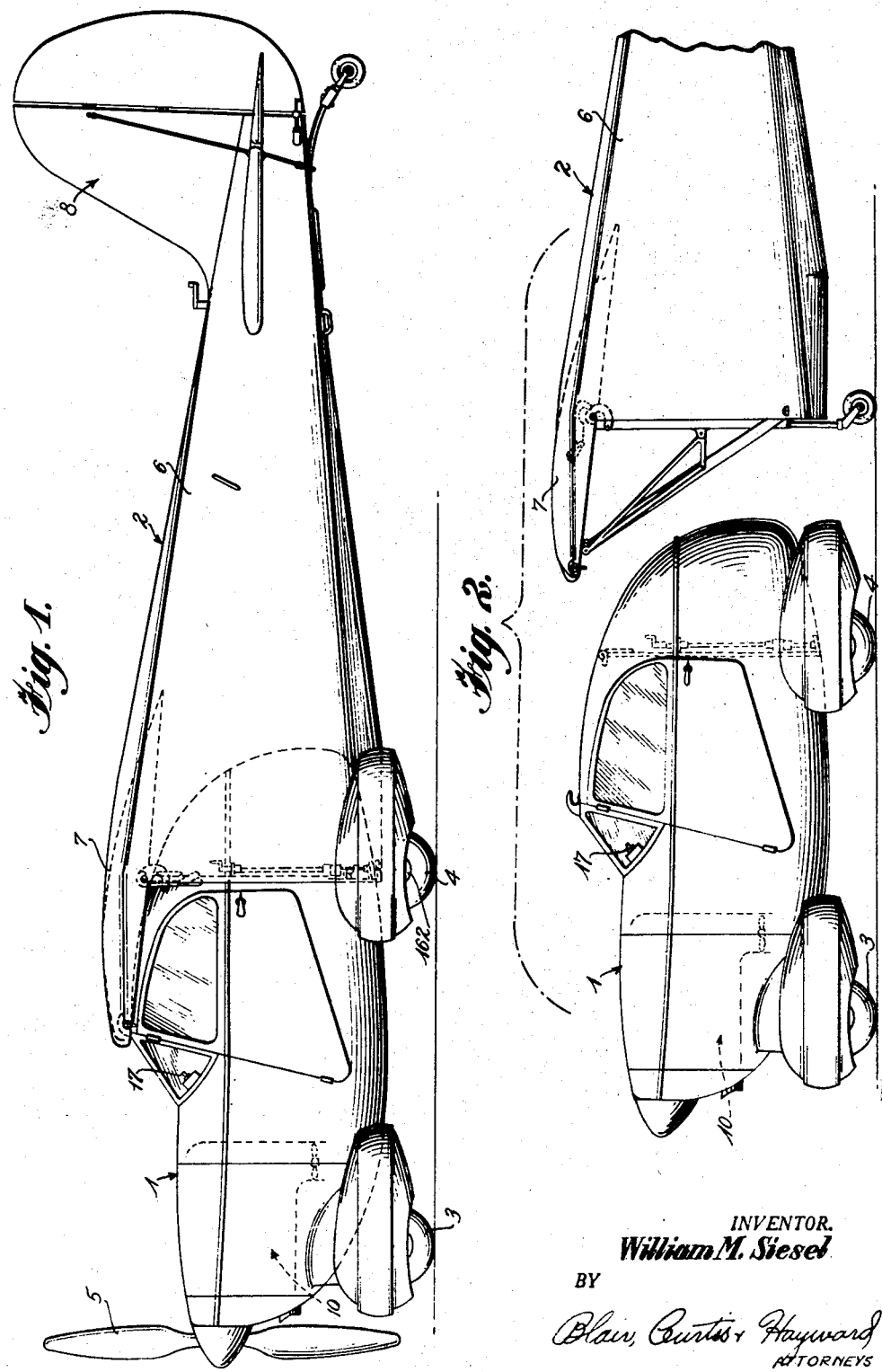
INVENTOR.
*William M. Siesel*
BY
*Blair, Curtis & Hayward*
ATTORNEYS

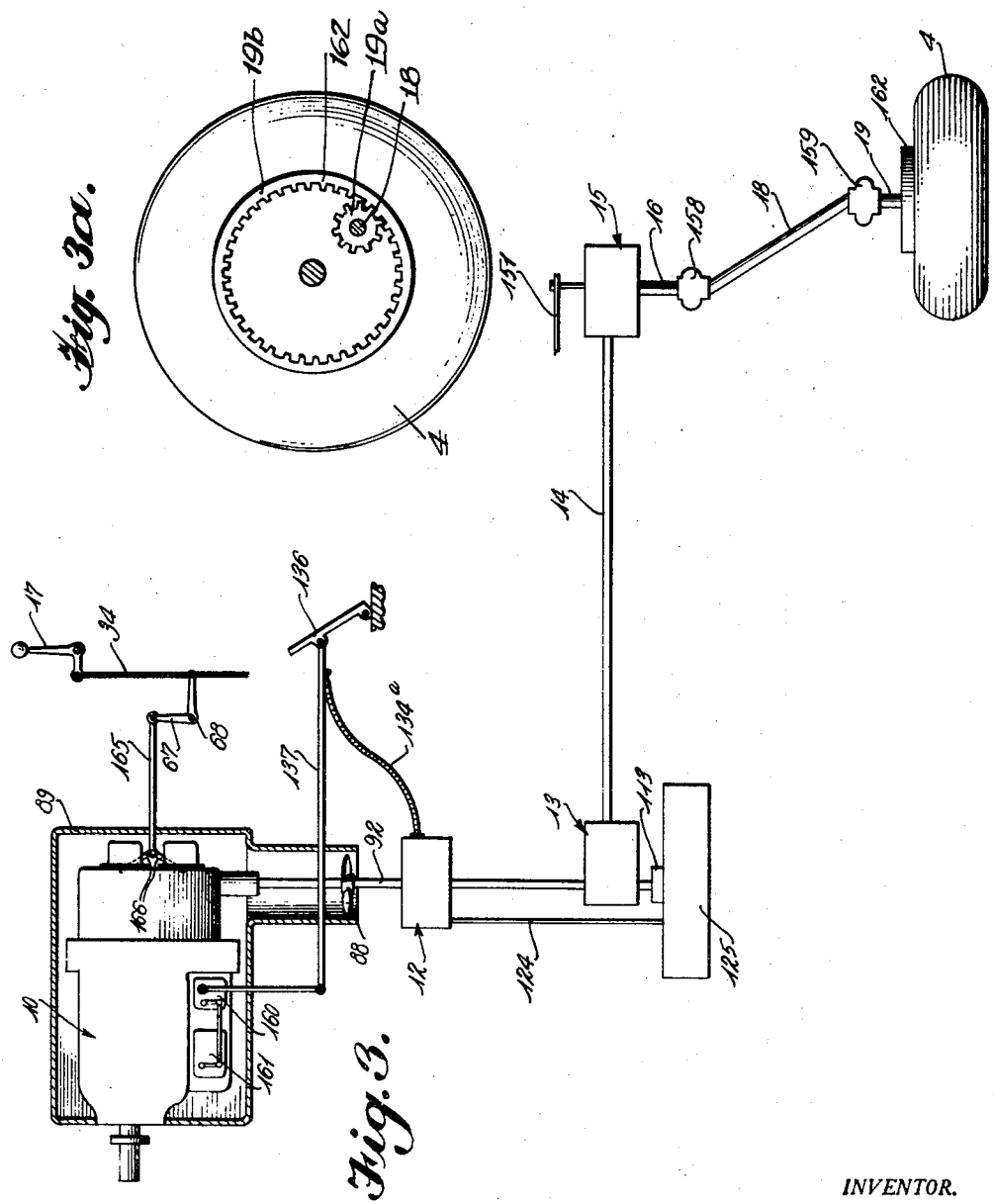

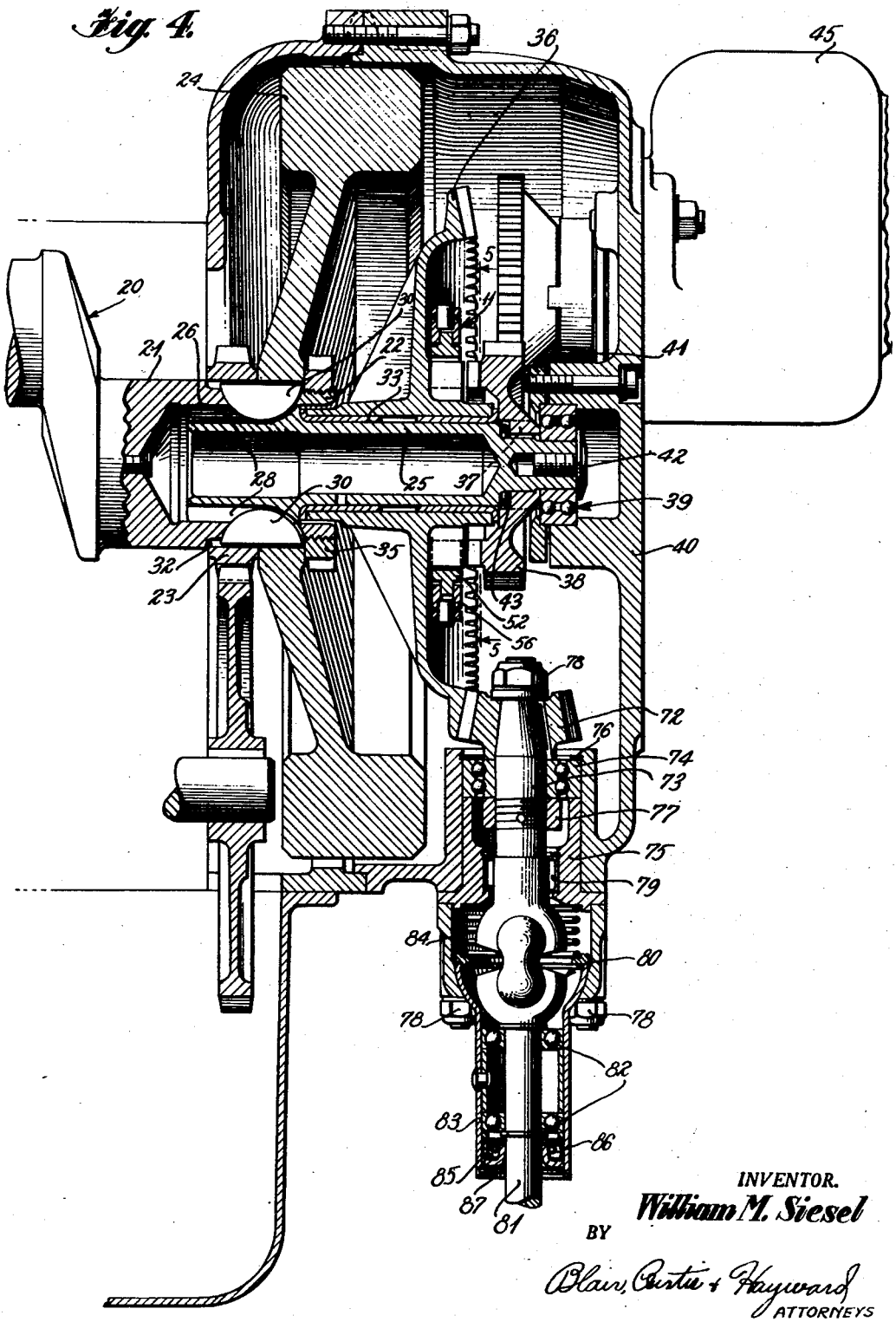

June 19, 1951  W. M. SIESEL  2,557,894
POWER TRANSMISSION
Filed Oct. 19, 1945  7 Sheets-Sheet 4

INVENTOR.
William M. Siesel
BY
Blair, Curtis & Hayward
ATTORNEYS

June 19, 1951 W. M. SIESEL 2,557,894
POWER TRANSMISSION
Filed Oct. 19, 1945 7 Sheets—Sheet 7

INVENTOR.
William M. Siesel
BY
Blair, Curtis & Hayward
ATTORNEYS

Patented June 19, 1951

2,557,894

UNITED STATES PATENT OFFICE 2,557,894

POWER TRANSMISSION

William M. Siesel, Morrisville, Pa., assignor to Continental, Incorporated, Washington, D. C., a corporation of Connecticut Application October 19, 1945, Serial No. 623,339

4 Claims. (Cl. 74—645)

This invention relates to a power unit for driving a vehicle. More particularly the invention relates to such a unit adapted for use in a dual purpose vehicle, e. g., one powered by an airplane engine, or designed to serve both as a land vehicle and as an aircraft.

Upon the development of reliable, light, low-cost airplanes it was generally assumed that a large market would develop, just as two decades earlier the automobile market had developed. Such expectations have not been realized; and upon analysis it is evident that one of the principal objections which has held them back is the fact that airplanes can take a person only from an airport to another airport.

Airports are of necessity located on the outskirts of communities, not infrequently many miles from the flier's home. Thus the time saved by the speed of aerial travel is often consumed in waiting for transportation to and from the airports.

Furthermore the expense of transportation between the airport and the actual destination is often such as to make the economy of actual aerial travel seem a fallacy. Even if a flier drives his own automobile to the airport of departure, when he lands at the airport of destination, he is still dependent upon taxis or buses. When the expense for taxis and buses and the expense of the automobile are added to the expenses of ownership, upkeep and operation of the plane, and the initial cost of the plane is taken into consideration, it is easy to see why few persons consider it feasible to own both an automobile and an airplane.

Since the average man makes at least a hundred trips of five miles or less in his automobile to every trip which is long enough to use an airplane between airports, and since he cannot afford both an automobile and an airplane, his choice between them is obvious.

It has often been suggested that the ideal vehicle would be one which could fly like an airplane and then, upon landing, could remove or fold its wings, propeller, etc., and drive down the roads like an automobile. The suggestion has obvious advantages which have led to several attempts to make such a vehicle; but both experience and engineering considerations have long ago established that the requirements of aircraft and of automobiles are essentially different and their structures although similar in functions are very different in performance. Thus, in fact, the design of a satisfactory automobile is difficult to reconcile with airplane design.

Among the most troublesome of these difficulties is the design of the power unit. An airplane engine capable of sustaining the vehicle in flight must have characteristics differing in various respects from those which are in an automobile. Thus, if a standard transmission of ordinary design is made heavy enough to transmit the full power of such an engine, it would be too heavy to carry around during flight as an aircraft. Even without regard to the torques transmitted, the clutch, speed-change gearing, differential gearing and rear axle shafts, etc., involve excessive weight for flight and the latter of these, by increasing the unsprung weight, greatly increases the inertial stresses of rough landings.

Aviation engines are designed to operate always with the propeller attached. With the propeller removed, as it must be for road travel, the engine is easily damaged by "racing" and at low speeds its operation is rough. Such engines have been developed by long experience and intensive engineering to meet the requirements of flight with the least possible weight per horse-power. To exchange such engines for a compromise design more nearly meeting the requirements of land travel would necessitate sacrifice of the efficiency now achieved in aircraft.

It is one object of my present invention therefore to provide a power unit for such dual purposes vehicles in which standard aviation type engines can be used and by means of a novel transmission and accessory devices it is made wholly satisfactory for operation of a land vehicle. Another object is to provide such a power unit which is simple, practical, and thoroughly durable. More specific objects are to provide a power unit of the above character which will be efficient in use, to provide a power unit which can be readily switched from use for an aircraft to use for a land vehicle, to provide a power unit in which the structural units are so disposed and combined as to give adequate strength without heavy construction, and to provide a power unit which is adapted to withstand hard usage as a land vehicle without becoming unsafe for flight. In general it is an object of the invention to overcome difficulties which have stood in the way of successful land-air vehicles. Other objects and advantages of the invention will be apparent from the following specification.

In this specification and the accompanying drawings I have set forth one embodiment of my invention and have suggested various modifications and alternatives. It should be understood that these are not intended to be exhaustive or limiting of the invention, but on the contrary are given with a view to enabling others not only to practice my invention, but so fully to understand it and the principles thereof that they will be enabled readily to modify and adapt these examples and to embody the invention in many forms, each as may be best adapted to the conditions of a particular use.

Figure 6:
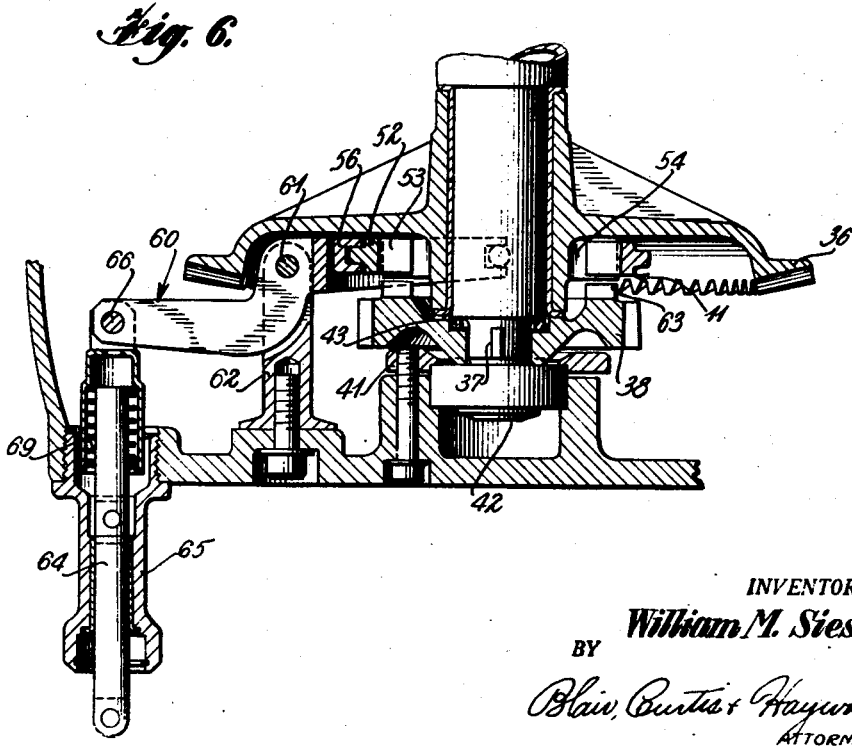
Figure 7:
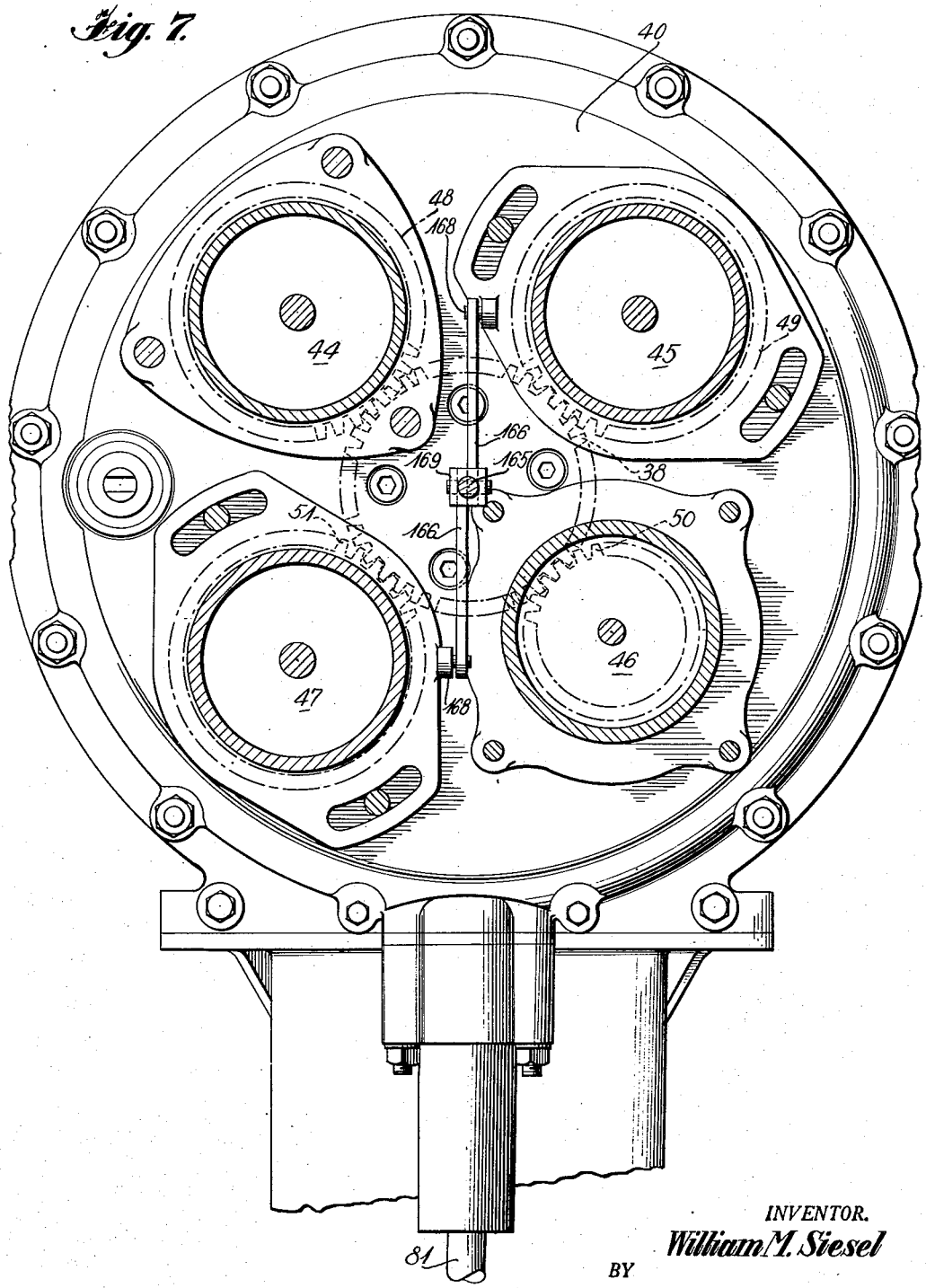
Figure 8:
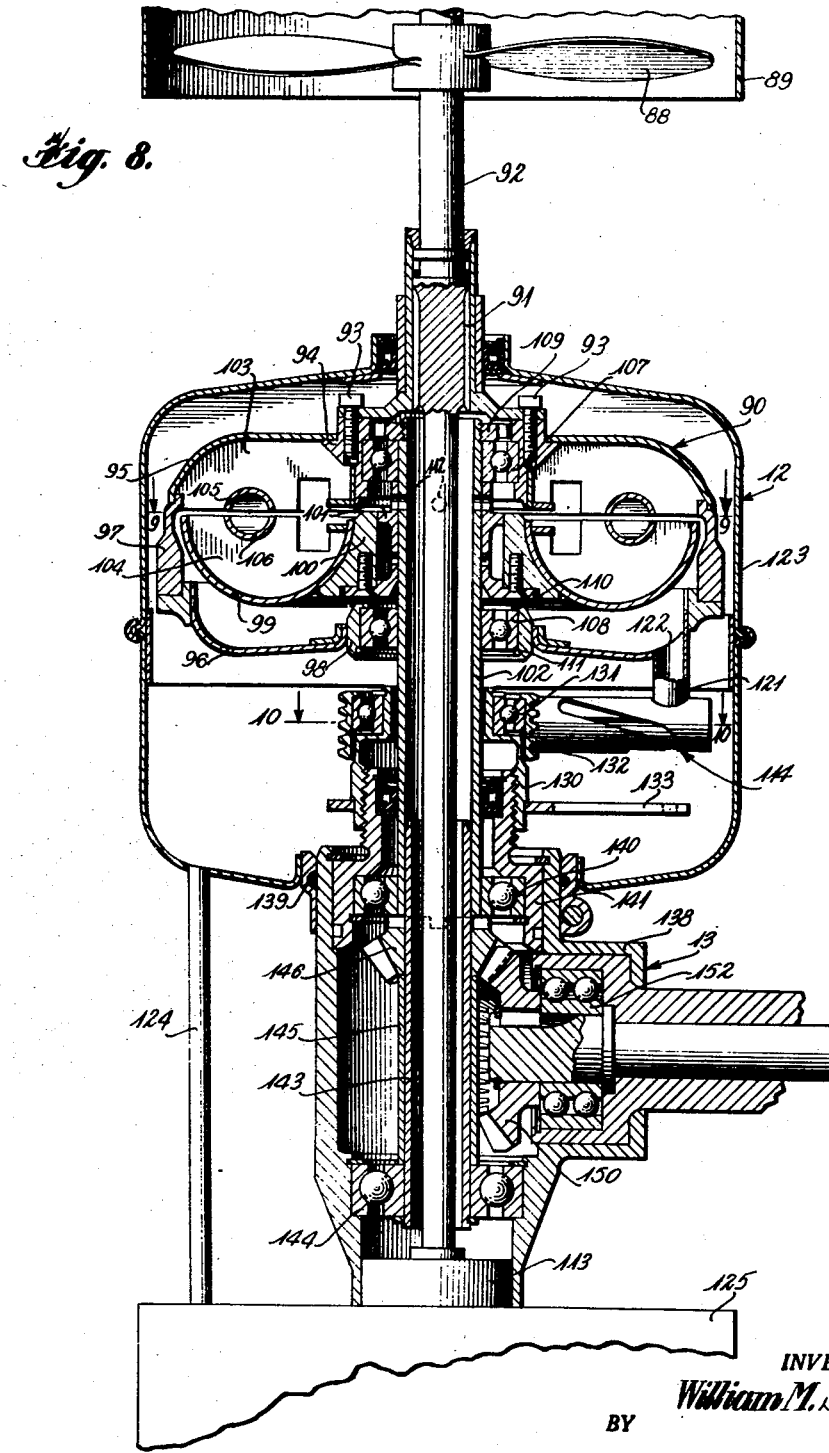
Figure 9:
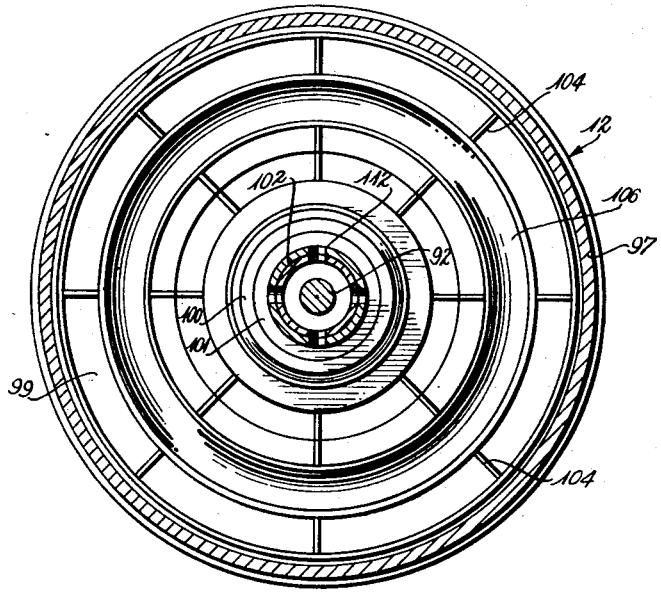
Figure 10:
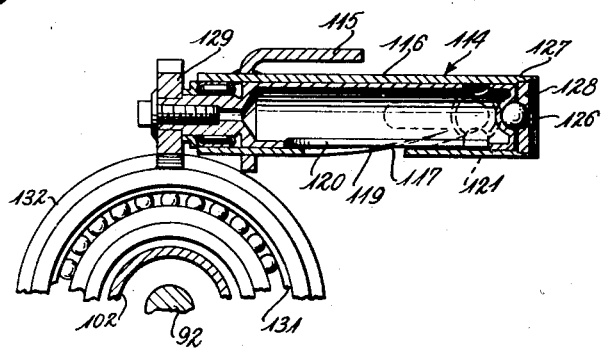
Figure 11:
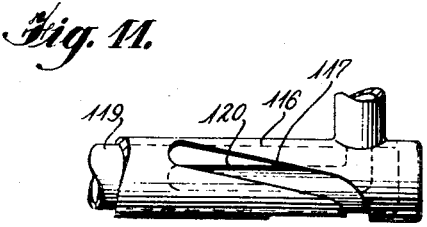

Referring now to the drawings, in which is shown one of the various possible embodiments of this invention, Figure 1 is a side elevation of the vehicles in which the automobile and airplane sections are connected together, Figure 2 is a side elevation, partly broken away, of the automobile and airplane sections in which the sections have been disconnected and the propeller removed from the automobile section, Figure 3 is a diagrammatical showing of the power unit for the vehicle, Figure 3a is a diagrammatic showing of the ring and pinion gear connection that drives the rear wheels, Figure 4 is a vertical section taken through the rear portion of the power unit shown in Figure 3, the plane of said section passing through the crankshaft of the motor, Figure 5 is a vertical section taken on the line 5—5 of Figure 4, Figure 6 is a horizontal section taken on the line 6—6 of Figures 4 and 5, Figure 7 is a rear elevation of the motor taken from the line 7—7 of Figure 4, Figure 8 is a vertical section taken on a plane perpendicular to Figure 7 and there-below through the hydraulic clutch and the mechanism associated therewith, Figure 9 is a horizontal section taken on the line 9—9 of Figure 8, Figure 10 is a horizontal section taken on the line 10—10 of Figure 8; and, Figure 11 is a fragmentary view in elevation of a valve sleeve shown in section in Figure 10.

Similar reference characters refer to similar parts throughout the several views of the drawings.

The power unit described hereinafter is constructed for use in the vehicle described in United States Letters Patent of Robert E. Fulton, Jr., Patent No. 2,430,869 granted November 18, 1947. This vehicle includes an automobile section 1 which is detachably connected to an airplane section 2. The automobile section is provided with four wheels 3 and 4, a propeller 5, and a motor 20 (Figure 3). The airplane section 2 to which the automobile section is detachably connected as described in the said co-pending application includes a wing 7 mounted on a fuselage 6 with tail surface generally indicated at 8.

A lever 17 (Figure 2) is provided which, when shifted between car and plane positions, conditions the vehicle for operation as an airplane or a car. The propeller 5 may be detached from the motor 10 when it is desired to use the automobile section of the vehicle, e. g., as described in United States Letters Patent of Robert E. Fulton, et al., Patent No. 2,509,096, granted May 23, 1950. In general the power unit includes motor 10 (Figure 3) which, by means of a clutch generally indicated at 11 (Figure 4), may be connected to or disconnected from the transmission mechanism which drives one or more of the wheels particularly, as shown, a rear wheel 4 (Figure 1) of the automobile section and thus the motor acts as the power unit for the automobile section. The drive to wheel 4 is through a hydraulic clutch generally indicated at 12 (Figure 3), a gear box generally indicated at 13, a drive shaft 14, a gear box 15, which includes a reversing gear, shafts 16, 18, and 19, and a pinion 19a and ring gear 19b in the hub of wheel 4 (Figure 3a).

The crankshaft 20 (Figure 4) of motor 10 is of a standard aviation type engine mounted upon usual bearings not shown, and at its forward end is provided with a thrust bearing to absorb the thrust of the propeller 5 when the vehicle is used as an airplane. The crankshaft 20 extends rearwardly from the rear main bearing 21 thereof to provide a portion 22 on which a cam shaft drive gear 23 and accessory drive gear are ordinarily mounted. As shown in Figure 4, I have replaced the accessory drive gear with a relatively light flywheel 24 to smooth the idling of motor 10 after the propeller has been removed. Although it is desirable, the flywheel is not essential to the operation of the motor as the power unit for the automobile section, if other features of my invention are used as herein described.

A transfer shaft 25 has been added with its left-hand portion as viewed in Figure 4 extending into a bore 26 in the end of crankshaft 20. The left-hand portion of shaft 25 has key slots 28 therein register with key slots in portion 22 of crankshaft 20 and key slots in gear 23 and flywheel 24. Connections between all of these key slots are established by keys 30. It will be noted that the portion 22 of crankshaft 20 on which gear 23 and flywheel 24 are mounted is of slightly smaller diameter than the main bearing portion 21. This forms a shoulder 32 against which gear 23 is held by a nut 35 acting through the hub of flywheel 24. Nut 35 is threaded onto the inner end of crankshaft 20. Because of the length of key slots 28 and because of the depth of 26, crankshaft 20 is free to expand rearwardly, e. g., to accommodate thermal expansion, without affecting the driving connections between the crankshaft 20 and shaft 25.

Shaft 25 has a portion 33 of reduced diameter on which a bevel gear 36 is rotatably mounted. Near the right-hand end 37, shaft 25 is of still further reduced diameter and is splined for engaging a gear 38. The right-hand end of transfer shaft 25 is mounted on a bearing generally indicated at 39 which in turn is held by a clamping ring 41 bolted to housing 40. Shaft 25 is connected to bearing 39 by a cap screw which screws into a threaded bore in the end of shaft 25. Screw 42 acts through the inner ring of bearing 39 to urge the hub of gear 38 toward a seat on shaft 25, which is formed by a wire ring 43 engaging the shoulder between the portion 33 and the right-hand portion 37 of the shaft 25. This ring 43 is not essential to the invention, but is a convenient design for practical manufacture.

The accessory units 44, 45, 46, and 48 (Figures 4 and 7) for motor 10 are mounted on, and extend to the right of housing 30 as viewed in Figure 4. These units, which include the magnetos, generator, starter, etc., are driven by gears 48, 49, 50, and 51 which mesh with gear 38 (Figure 7). As gear 38 is driven through splined portion 37 whenever crankshaft 20 turns over, the accessory units except the starter are driven whenever the motor is running.

The jaw clutch 11 is used to connect the motor to the transmission mechanism. The clutch engages dogs on both gear 38 and gear 36 whenever it is desired to operate the automobile section of the vehicle. The clutch ring 52 of clutch 11 (Figures 4, 5, and 6) has a plurality of teeth 53 which engage between teeth 54 and ride on the hub of bevel gear 36. To provide for movement of clutch ring 52 into engaged or disengaged position a grooved clevis 56 is fitted over the periphery of ring 52. This clevis has a pair of pins 57 extending outwardly therefrom and diametrically positioned thereon with respect to ring 52. A yoke generally indicated at 60 is pivotally mounted by a pin 61 (Figure 6) on a bracket 62 on housing 40. The ends of the two arms of this yoke are slotted to receive pins 57 and thus, as yoke 60 is pivoted upon its pivot pin 61, it acts through clevis 56 to move clutch ring 52 into and out of engagement with teeth 63 integral with and extending forwardly from gear 38. A link 64, which extends through a gland member 65 on the housing 40, is pivoted at 66 to yoke 60.

As described in United States Letters Patent of Robert E. Fulton, Jr., et al., Patent No. 2,509,095, granted May 23, 1950, two ignition locks for the land vehicle and airplane operation respectively, and a master lever 17 interlocking therewith control the shifting from one type of operation to the other. Since the yoke 60 is connected to and controlled by the master lever 17 (Figure 2) and the master lever can only be moved when the ignition locks are both "off," clutch 11 cannot be moved into engaged position with respect to the teeth on gear 38 when gear 38 is being driven.

As described in the above patent, cable 34 is moved whenever the master lever 17 is shifted. Referring to Figure 3, this cable 34 is connected to one arm of a bell crank 67 pivotally mounted at 68 on the framework of the automobile section. The other end of this bell crank is pivotally connected to the clutch shifter link 64. The clutch shifter link 64 is thus moved inwardly or outwardly depending upon the direction in which the master lever is moved. Referring again to Figure 6, it can be seen that, when cable 34 moves rod 64 inwardly from the position it occupies in Figure 6, it shifts the jaw clutch ring 52 into engaged relationship with teeth 63 and when rod 64 is moved outwardly, the jaw clutch ring 52 is moved to a disengaged position. Because the clutch 11 can never be moved unless the motor 10 has been stopped, it is quite likely that its teeth 53 may not register with the spaces between teeth 63 on gear 36, and consequently, that the ring 56 cannot move to its engaged position when lever 17 is shifted. This is taken care of by the spring connection 69 in the link 64. If the teeth of jaw clutch 11 are not in register, yoke 60 can move only a short distance, but since the movement of the master lever 17 pushes in the link 64, its full distance, the remainder of the movement is absorbed by movement of push rod 64 into the cup 70, compressing spring 69 between them. As soon as the motor begins to turn, so that the teeth of clutch 11 come into register, spring 69 acting on cup 70 pushes the yoke 60 back and thus snaps the ring 56 into its engaging position.

Referring to Figure 4, bevel gear 36 engages and drives a bevel pinion gear 72 keyed to the tapered end of a shaft 73. In the example shown, the ratio between gears 36 and 72 is one to five. Such a step-up in transmission speed is very important because it reduces the torque load imposed on the transmission mechanism sufficiently to permit the use of light-weight gearing, shafting, and clutches such as can be practically carried on the aircraft during flight. A relatively high transmission speed is carried right thru to the driving wheel, where it is geared down to wheel speed by a small pinion driving an internal ring gear (not shown) in the hub 162, and even at this point the wheels are made smaller than in a normal automobile to keep down the weight of the gearing. This stepped-up transmission becomes feasible for low-cost production because its operation is limited to the relatively lower speed of automobile operation by the governor 160, and the clutch 11, both interlocked with the shift-over device 17 so that the motor cannot be run at full speed when the transmission is connected; and the transmission is disconnected when the engine is set to run at full speed (as in take-off).

The shaft 73 is mounted on bearing 74 which in turn is mounted on housing 40 between a universal joint housing 75 and a locking snap ring 76. The inner race of bearing 74 is clamped between a nut 77 threaded on shaft 73 and the hub of gear 72, gear 72 in turn being held by a nut 78.

Universal joint housing 75 is mounted on housing 40 by nuts 78 on stud bolts in the housing 40; and to prevent oil from leaking along shaft 73 out of housing 40 a needle bearing is provided.

A universal joint (generally indicated at 80 as a type having constant angular velocity, available under the name "Tracto" from the New Process Gear Company) positioned without housing 75 connects the lower end of shaft 73 to a shaft 81. Shaft 81 has positioned thereon by bearings 82, a sleeve member 83, which constitutes the lower half of a ball and socket housing for the universal joint 80. The bell-shaped upper end of this sleeve 83 is resiliently held in engagement with the lower end of universal joint housing 75 by a spring 84, thus forming a grease-tight gland. A second gland 85 is provided at the lower end of sleeve 83 is held against the shaft by garter spring 86. A snap ring 87 holds this gland positioned in the sleeve and an inner snapring holds the bearings 82.

Shaft 81 extends downwardly from universal joint 80 as shown in Figure 8, and drives a fan 88, advantageously a narrow bladed high-speed propeller fan. Thus, whenever the motor is running with the master lever 17 set for land operation, the fan 88 operates to draw air through a housing, diagrammatically indicated at 89 (Figure 3), over cooling surfaces of the motor 10 and hydraulic clutch 12 which is positioned immediately beneath the fan. In the example illustrated, the motor is cooled directly through fins on its cylinders and their heads; but obviously, its heat may be transferred to cooling surfaces by a liquid coolant, and this is in fact done in the clutch, wherein the oil is pumped in continuous circuit through a cooling member. Instead of connecting the fan through the disconnect clutch 11, it may be connected to the motor through a centrifugal clutch which disconnects its drive at a predetermined maximum speed at or above the highest speed attainable when the controls are set for automobile operation, and re-connects only when the speed drops below said maximum. When the combination operates as an airplane, its driving propeller will, of course, create a sufficient air flow for cooling without operation of the fan 88.

The impeller portion 90 (Figures 8 and 9) of hydraulic clutch 12 is driven through a splined flange member 91 which fits complementary splines formed on the drive shaft 92, which, in effect, is an extension of shaft 81. This, as well as a splined connection between shafts 81 and 92, permits vertical movement of motor 10 with respect to clutch 12 which is secured on the automobile frame.

Flanged member 91 is connected by bolts 93 to the radially vaned semi-toroidal impeller member 94 which, together with impeller housing members 95, 96, 97, and 98 rotate with shaft 92. The driven portion of the clutch consists of the radially vaned semi-toroidal rotor 99 (members 95 and 99 are generally called the "grapefruits"), and the central frame member 100, which is bolted to the flanged ring 101 on the driven shaft 102 and is brazed or welded to the "grapefruit" 99. Each of these "grapefruits" 94 and 99 is provided with angularly spaced radial vanes 103, 104, and a semi-toroidal core 105, 106, to form a throat near the periphery—all in accord with standard practice in such turbo-type fluid couplings.

The driving portion 90 of hydraulic clutch 12 is rotatably mounted upon the driven shaft 102 by a pair of bearings 107 and 108, and the driven member, as indicated above, is secured on shaft 102 in driving relation thereto by bolting the central frame member 100 to the flanged sleeve member 101 welded or brazed onto shaft 102. The upper end of this sleeve 101 also forms a seat on which bearing 107 is held by nut 109. Bearing 108 is mounted on ring member 98 between a flange 110 and a lock ring 111. These bearings permit the driving portion 90 of the clutch to rotate freely with respect to shaft 102, and thus shaft 102, which is turned by the driven portion of clutch 12, is also freely rotatable with respect to the driving portion of the clutch. Thus the only connection between the driving and driven portions of the clutch is through the hydraulic fluid introduced into the clutch as described hereinafter.

When portion 90 of the clutch is driven and hydraulic fluid is introduced therein through holes 112 in the hollow shaft 102 and sleeve 101, centrifugal force due to the spinning of member 90 throws the fluid outwardly in the hydraulic clutch. If the radial depth of fluid is sufficient, it forms a transfer medium transferring power from the driving portion of the clutch to the driven member 99 and thus to tubular shaft 102.

To supply oil to clutch 12, an impeller type pump 113 is provided at the bottom of shaft 92 (Figure 8). Pump 113 is driven by shaft 92 whenever the motor is running and the master lever 17 is set for land operations. From this pump oil is forced upwardly through space between shafts 92 and 102 and thence into the clutch through a plurality of ports 112. This pump is designed to provide at all times an excess of oil beyond the requirement of the clutch and the excess is drained back through a pair of diametrically disposed valves 114.

Each valve 114 is mounted, as shown in Figure 8, upon the bottom of the driven portion 90 by a pipe 121 and braced by a bracket 115 hidden in Figure 8, but shown in section on Figure 10. The valve 114 includes a body 116 (Figure 10) cylindrically shaped in cross-section having a slot 117 (Figures 8 and 11) cut through its sidewall, this slot being spiral from end to end and then brought back longitudinally at 117'. An inner sleeve 119 is rotatably fitted into body 116 and provided with ports 120 adapted to register with a pipe 121 in all positions of sleeve 119, and provided also with a longitudinal slot 120 which crosses the slot 117. The point at which these slots cross or register depends, of course, upon the rotational position of sleeve 119.

The valve 114 is connected by a pipe 121 to a hole 122 extending through portion 96 of the clutch adjacent the periphery thereof. Excess hydraulic fluid from the interior of housing 96 drains through hole 122, tube 121, body 116, and ports 120 to the interior of sleeve 119, and then along the longitudinal slot 120 until it reaches a registering hole or portion of slot 117; whereupon it escapes into housing 123 eventually to drain back through pipe 124 into a sump 125 thence to be pumped again to the clutch.

Sleeve 119 is closed at its inner end and provided with a bearing plate 121 at its outer end. A ball bearing 126 is positioned between its outer end plate 127 and the outer end 128 of valve body 116 to assure coaxial alignment and permit sleeve 119 to be easily turned when the valve is rotating at a high rate of speed with the driving portion 90 of the clutch.

The inner end of sleeve 119 is mounted in a needle bearing 126 and then projects beyond the body 116 where it is provided with a gear 129 by which it is rotated to bring the opening through the registering portions of slots 120 and 117 closer to or farther from the pipe 121. Since this opening forms the overflow outlet from the rotating annulus of oil in the portion 90 of the clutch, such rotary adjustment of sleeve 119 controls the radial level of the oil in said annulus, and accordingly the valve 114 permits the user to control the amount of power transmitted by the clutch.

To turn gear 129 (Figure 10) and thus change the setting of valve 114, a ring-shaped member 130, best shown in (Figure 8) having helical threads thereon is mounted on complementary threads on the housing of gear box 13. Ring shaped member 130 carries a bearing 131 on its upper portion and the outer race of bearing 131 has a cylindrically shaped rack 132 (i. e. having annular flanges of gear tooth section) secured thereto. As ring member 130 is raised and lowered, the teeth on rack 132 act upon gear 129 to rotate, and thus adjust, sleeve 119 in valve 114. An arm 133 on ring 130 is connected by suitable linkage (omitted in Figure 8 to avoid confusion of lines and shown diagrammatically as bell crank 134 and Bowden wire 135 in Figure 3) connected to the accelerator pedal 136 or an operative part 137 connected thereto. Thus, whenever the accelerator pedal is pressed inwardly, ring 130 is rotated with respect to gear box 13 causing ring 132 to move upwardly and thus adjust valve 114 to increase the radial depth of the fluid in the clutch; and whenever the pedal is released, valve 114 reduces the radial depth of the fluid in the clutch.

The housing 123 already mentioned, encloses both the hydraulic clutch and the valve adjusting mechanism just described. This housing is clamped onto a neck of housing 138 for gear box 13 as shown in Figure 8, and is provided with gasket 139 to protect against oil leakage.

At its lower end shaft 102 is mounted on a bearing 140 (Figure 8) which in turn is mounted on a housing member 141 secured to the housing 138 of gear box 13. A pilot shaft 143 extends upwardly into the lower portion of shaft 102 and its lower end is mounted in bearing 144. A sleeve 145 on the exterior of shaft 143 serves as a spacer to position bevel pinion 146 with respect to bearings 140 and 144 and engage a castellated hub on gear 146 with the end of shaft 102. Thus the shaft 102 can be readily withdrawn from the gear box 13 and the latter is removable as a unit without removing the clutch.

Bevel gear 146 drives a longitudinal drive shaft 14 through a bevel gear 150 thereon. The end of shaft 14 is mounted in the gear box 13 by a bearing 152. The ratio between the gears 146 and 150 as shown is three to two, thus reducing somewhat its operating speed as compared with the clutch, which benefits most from the increased speed, but still retaining a substantial mechanical advantage with respect to both the motor and the road wheel.

Referring to Figure 3, shaft 14 acts through a reversing gear box 15 controlled by a manually operable lever 151 to drive wheel 4 either forward or back. The gear box 15 operates with a 1:1 ratio, as shown. The connection between wheel 4 and the gear box 15 is through shafts 16, 18 and 19, universal joints 158 and 159 which permit the wheel to move freely with respect to the body of the vehicle when it is being used as a portion of the landing gear of the airplane when driving over bumps when used as an automobile, a pinion (not shown) on the end of shaft 19 at 4, and ring gear (not shown) on the hub wheel 4. The pinion and ring gear ratio is such as is necessary to reduce wheel R. P. M. back down from high drive-shaft speed (permitting light weight mechanism) to proper wheel R. P. M. for driving.

The governor 160 (Figure 3) may be any standard type (e. g. a spring-loaded fly ball governor) adjustable to maintain any speed within a predetermined range. It is connected to the carburetor 161 of the motor so as to control the throttle adjustment, and manual controls adjust the speed setting of the governor rather than the throttle as is usual. As the load upon the motor is increased by adjusting valve 114 to increase the radial depth of hydraulic fluid in the hydraulic clutch, the governor 160 maintains the minimum satisfactory speed of the motor, e. g., approximately 600 R. P. M. When the valve is adjusted to maximum depth so that the hydraulic clutch is operating at maximum efficiency, then the speed of the motor may be increased by adjusting governor 160, e. g., up to 1200 R. P. M. These latter changes are transmitted through the clutch to the wheel 4 with corresponding increases in the speed of the vehicle. When valve 106 is adjusted to empty liquid from the clutch, it is, of course, effectively disengaged and the motor runs idle.

Thus, by a simple accelerator pedal the operator of the vehicle controls its speed when used as an automobile first by varying the radial depth of the liquid in the hydraulic clutch and subsequently by adjusting the governor. It will be understood, however, that this interrelated, single pedal control is not essential to other features of the invention. The governor may with advantage also be coordinated also with another element whose position or condition indicates the loading of the motor, so as to allow the motor under heavy load to come up to a higher speed than is permitted in normal operation, e. g., to maximum torque.

Even with the transmission features set forth above, it is found advantageous to use a drive ratio between motor and wheels such that the maximum load during operation as an automobile occurs at motor speeds substantially lower than the speed of maximum loading during operation as an aircraft. This is another respect in which the requirements of aircraft and automobile engines are inconsistent and would normally result in unsatisfactory performance of the engines for automobile use. According to the present invention, however, this difficulty is avoided by shifting the range of spark timing when the change over is made from aircraft to automobile operation and vice versa. As shown, this is accomplished by rotating the housing and with it the field magnets distributor points, etc. of the magnetos 45, 47, about their rotors. As shown (in Figure 7), these magneto housings are mounted on the housing 40 by bolts in arcuate slots while a cylindrical flange on the magneto housing fits into a corresponding cylindrical opening in the housing 40. When the master control lever 17 is thrown from one position to the other it acts thru suitable connecting linkage (shown diagrammatically at 165 in Figure 3) to rotate the housings of magnetos 45 and 47 thru the angle adapted to bring the spark timing range to the proper angular position. As shown (in Figure 7) this linkage terminates in a toggle 166 having its ends, respectively connected to arms 168 pivoted on the magneto housings respectively and on a central slide 169 movable axially in bearings 170 parallel to the axis of the magnetos, whereby the toggle action is distributed equally to the two magnetos. The particular shift will depend upon the characteristics of the motor used and the other features of design of the auto and airplane.

In the example illustrated a shift of 15° is made in the spark retard direction for auto operation and in the advance direction for aircraft operation. Instead of rotating the magneto housing, one may also use a type of magnetos e. g., such as that used on certain flying boats, with a built in spark-retarding mechanism provided that the mechanism is capable of sufficiently shifting the range of operation while still allowing adjustment, manual or automatic, of spark timing within that range to meet varying conditions of operation.

By use of a cushioning type coupling 12 in the transmission mechanism, I have first of all protected the aviation motor from road shocks and overloads which it is not designed to withstand. By permitting any desired degree of slip and providing for efficient cooling and recirculation of the fluid used in the coupling, and thus making possible the utilization of any part of the available engine torque up to its maximum, I have avoided the necessity for a change-speed transmission device and thus eliminated a major source of excess weight. By gearing the transmission up to a relatively high ratio above the engine speed, I have greatly increased the efficiency of the centrifugal inertia type coupling to the point where I am able to use, for example, couplings substantially the same as those used on aircraft for driving superchargers, and thus excess weight for the land operation is further reduced. By means of the radial level control in the hydraulic coupling, I am able to give the operator, during land operation at speeds below the equivalent of the minimum engine speed, full control substantially equal in all respects to the accelerator control of an ordinary automobile, and I have avoided the necessity of operating the aircraft engine at speeds below those for which it is designed and gives satisfactory performance.

By combining the slipping clutch with a governor controlling maximum engine speed, I am able to apply the full power of the engine for hill climbing etc., while protecting the engine from tearing itself to pieces in idle "racing," as an aircraft engine will if relieved of its propeller load.

By use of an additional mechanical clutch between the motor shaft and the transmission mechanism, I have made possible the high gear ratio without the necessity for designing it to withstand the tremendous speeds which would be involved if the high gear ratio were effective during aircraft operation. By connecting this additional clutch and the service clutch, I assure the necessary volume of cooling air for land operation, but again I avoid the excessive speeds which would be likely to damage the fan if it were connected during operation as an aircraft.

By use of the air duct with forced circulation, I am able to operate on land like an air-cooled automobile and in addition to provide efficient cooling for the slipping clutch; and by using a narrow blade propeller, or other circulating means offering little or no obstruction in the duct when idle (as in flight) and providing a smooth flow path from the front of the engine to a point on the fuselage where the cooling air can be discharged without loss of aerodynamic efficiency of the aircraft, I have overcome the objection that aircraft engines seriously overheat when deprived of the strong air blast provided by their own propellers.

By gearing up the transmission to a speed above that of the motor, I have greatly reduced the weight of all parts of the transmission mechanism, and by carrying this high-speed drive, not merely to the rear axle, but right into the wheel, and even using relatively small wheels, I have eliminated such heavy parts as differential gearing and driving axles which are commonly found on automobiles. This is of especial importance in the dual purpose vehicle described above, because such parts, being unsprung weight, would if present require excessively heavy framing and housings etc., to withstand the inertial stresses imposed by a rough landing or take-off.

The drive to a single wheel, as shown, although not essential to the invention, is advantageous in eliminating the drive shaft and gearing to other wheels, and has proven adequate because of the effectiveness of the other features of the invention in reducing the weight of the vehicle. It will be understood, also the drive may be to any one or more of the vehicle wheels.

Accordingly, a thoroughly efficient and practical mechanism has been described in which the power unit of an airplane is utilised as the power unit for a car comprising a section of the airplane. Furthermore, by the use of this mechanism the weight of the airplane is kept at a minimum without sacrificing efficiency in operation. It will thus be seen that the several objects hereinabove mentioned have been successfully accomplished.

Although the various features described above all cooperate in the total result described and interact with one another to give cumulative advantages, it will have been evident from the foregoing that many of them individually have such outstanding advantages that they will be found desirable even where the other features, for some reason, are not desired.

What is claimed is:

1. Power transmission and control mechanism for transmitting power between the power plant and at least one wheel of a combined air and land vehicle having a single power plant, that comprises a positive, locking-type clutch connected to receive power from the power plant, a step-up gearing connected to receive power from the clutch, a centrifugal fluid coupling connected to receive power from the step-up gearing, a reverse gearing connected to receive power from the centrifugal fluid coupling and a step-down gearing connected to receive power from the reverse gearing and transmit power to a wheel of the vehicle.

2. Power transmission and control mechanism as defined in claim 1, further characterized in that it includes means for controlling the coupling of the centrifugal fluid coupling, means for controlling the power generated by the power plant and a common means for simultaneously operating both of said control means.

3. Power transmission and control mechanism as defined in claim 1, further characterized in that it includes a valve for controlling the amount of fluid in the centrifugal fluid coupling, a throttle valve for the power plant and an accelerator coupled to both the aforesaid valve and the throttle valve.

4. Power transmission and control mechanism as defined in claim 1, further characterized in that it includes a fluid pump for continuously circulating fluid through the centrifugal fluid coupling, a valve arranged to control the amount of fluid in the fluid coupling and a manual control for said valve.

WILLIAM M. SIESEL.

REFERENCES CITED

The following references are of record in the file of this patent:

UNITED STATES PATENTS

| Number | Name | Date |
| --- | --- | --- |
| 1,923,225 | Moorhouse | Aug. 22, 1933 |
| 1,934,385 | Strauss | Nov. 7, 1933 |
| 1,963,720 | Sinclair | June 19, 1934 |
| 1,975,505 | Fottinger | Oct. 2, 1934 |
| 2,115,125 | Sinclair | Apr. 26, 1938 |
| 2,135,073 | Gerhardt et al. | Nov. 1, 1938 |
| 2,174,946 | Ray et al. | Oct. 3, 1939 |
| 2,202,455 | Klavik | May 28, 1940 |
| 2,215,003 | Johnson | Sept. 17, 1940 |
| 2,255,773 | Heftler | Sept. 16, 1941 |
| 2,289,440 | Kugel | July 14, 1942 |
| 2,296,642 | Huebner | Sept. 22, 1942 |
| 2,301,957 | Lang | Nov. 17, 1942 |
| 2,318,187 | Addison | May 4, 1943 |
| 2,373,467 | Frakes | Apr. 10, 1945 |
| 2,376,699 | Jandasek | May 22, 1945 |
| 2,427,936 | Walls | Sept. 23, 1947 |
| 2,444,691 | Barnes | July 6, 1948 |

FOREIGN PATENTS

| Number | Country | Date |
| --- | --- | --- |
| 472,619 | Great Britain | Dec. 21, 1935 |